United States Patent
Uehara et al.

(10) Patent No.: US 7,196,130 B2
(45) Date of Patent: Mar. 27, 2007

(54) THERMOPLASTIC RESIN COMPOSITION, POLYMER COMPOSITION, AND MOLDED PRODUCT COMPRISING THE COMPOSITION

(75) Inventors: Hiroshi Uehara, Ichihara (JP); Tomohiko Kimura, Ichihara (JP); Satoru Moriya, Tokyo (JP); Masayoshi Yamaguchi, Ichihara (JP); Hideshi Kawachi, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/511,826

(22) PCT Filed: Jun. 3, 2003

(86) PCT No.: PCT/JP03/06987

§ 371 (c)(1),
(2), (4) Date: Oct. 20, 2004

(87) PCT Pub. No.: WO03/106554

PCT Pub. Date: Dec. 24, 2003

(65) Prior Publication Data

US 2005/0131129 A1   Jun. 16, 2005

(30) Foreign Application Priority Data

Jun. 14, 2002 (JP) ............... 2002-173489
Nov. 19, 2002 (JP) ............... 2002-335717

(51) Int. Cl.
   *C08K 3/10* (2006.01)
   *C08K 3/22* (2006.01)
(52) U.S. Cl. ............ 524/436; 524/501; 524/504; 524/100
(58) Field of Classification Search .......... 524/436, 524/100, 501, 504; 523/200; 428/379
See application file for complete search history.

(56) References Cited

U.S. PATENT DOCUMENTS

| | | | | |
|---|---|---|---|---|
| 4,221,875 A | * | 9/1980 | Yukuta et al. ............ | 521/128 |
| 4,396,730 A | * | 8/1983 | Imahashi ............ | 523/200 |
| 4,913,965 A | * | 4/1990 | Keogh ............ | 428/379 |
| 6,214,924 B1 | * | 4/2001 | Bieser et al. ............ | 524/515 |
| 6,232,377 B1 | * | 5/2001 | Hayashi et al. ............ | 524/100 |
| 2001/0007888 A1 | * | 7/2001 | Asano ............ | 524/115 |

FOREIGN PATENT DOCUMENTS

| | | |
|---|---|---|
| EP | 0 372 540 A | 6/1990 |
| GB | 1405983 | 9/1975 |
| JP | 51-19858 | 6/1976 |
| JP | 54-022450 | 2/1979 |
| JP | 59-202240 A | 11/1984 |
| JP | 08-176343 * | 7/1996 |
| JP | 08-176343 A | 7/1996 |
| JP | 9-59441 A | 3/1997 |
| JP | 09-221567 * | 8/1997 |
| JP | 09-221567 A | 8/1997 |
| JP | 9-221567 A | 8/1997 |
| JP | 09-316250 A | 12/1997 |
| JP | 10-237237 A | 9/1998 |
| JP | 2000-239459 A | 9/2000 |
| JP | 2000-251538 A | 9/2000 |
| JP | 2000-272036 A | 10/2000 |
| JP | 2002-18992 A | 1/2002 |
| JP | 2002-018992 A | 1/2002 |

* cited by examiner

*Primary Examiner*—Ling-Sui Choi
(74) *Attorney, Agent, or Firm*—Buchanan, Ingersoll & Rooney PC

(57) ABSTRACT

A thermoplastic resin composition (Y) characterized by comprising (A) 20 to 64.9 wt % one or more ethylene copolymers comprising an ethylene/α-olefin copolymer, (B) 35 to 70 wt % metal hydroxide, and (C) 0.1 to 30 wt % grafted ethylene polymer. The resin composition has excellent flame retardancy and has satisfactory pliability/flexibility and excellent tensile properties. It is suitable for use as an insulating material or sheath for electric wires. Also provided are: a polymer composition (Z) having high flame retardancy, characterized by comprising relative to (AA) 100 parts by weight of a polymer such as a thermoplastic polymer or thermosetting polymer, in the ratio of (BB) 50 to 250 parts by weight of a metal hydroxide, (E) 0.1 to 40 parts by weight of a triazine ring containing compound, and (F) 0.1 to 40 parts by weight of a polyhydric alcohol; and a molded object obtained from the polymer composition. These are suitable for use as an insulating material or sheath for electric wires.

10 Claims, 1 Drawing Sheet

US 7,196,130 B2

THERMOPLASTIC RESIN COMPOSITION, POLYMER COMPOSITION, AND MOLDED PRODUCT COMPRISING THE COMPOSITION

TECHNICAL FIELD

The present invention relates to a thermoplastic resin composition and a molded article thereof and in particular to a thermoplastic resin composition suitable as an insulating material or sheath material for electric wires and a polymer composition of high flame retardancy and to a molded article comprising the same.

BACKGROUND ART

Conventionally, a sheath material and a partially insulating material for electric wires often make use of polyvinyl chloride (PVC), and its flexibility, flame retardancy and insulating properties have been appraised. Generally, PVC contains a large amount of plasticizer so that when the plasticizer is lost by heating etc., the PVC is easily hardened and generates a chlorine-based gas upon combustion, and thus development for electric wires which can be substituted for PVC has been desired in recent years.

Under these circumstances, various flame-retardant resin compositions based on ethylene-based polymers such as polyethylene have been proposed.

U.S. Pat. No. 6,232,377 describes a flame-retardant resin composition which comprises a specific ethylene-based copolymer selected from an ethylene/vinyl ester copolymer, an ethylene/α,β-unsaturated carboxylic acid copolymer and low-density polyethylene, and further comprises a metal hydroxide, a triazine ring containing compound and a specific flame-retardant compound. However, these ethylene-based polymers have a problem that pliability and flexibility are easily lowered when the amount of inorganic compounds such as metal oxides is increased in order to increase the flam retardant effect.

Accordingly, a first object of the present invention is to provide a resin composition excellent in pliability and flexibility and superior in tensile physical properties, a molded product comprising the same, particularly an insulating material and/or sheath for electric wires.

On one hand, many kinds of thermoplastic polymers and thermosetting polymers have been used in internal wires in home appliances, buildings, interior decorations, automobile parts, and electronic instruments. A majority of these polymers (particularly olefin polymers) are easily flammable.

From the viewpoint of protection against disasters, there is increasing demand for incombustibility and flame retardancy of various facilities and structures, and particularly high flame retardancy is required of home appliances that can be the origin of a fire. Criteria for flame retardancy of internal wire materials are stipulated by for example UL standards in the US (Underwriters' Laboratories Inc.) etc., and evaluated by a vertical flame test called VW-1 test. Accordingly, materials usable for a long time even exposure to high temperatures and fires are desired, and a method of conferring high flame retardancy on many thermoplastic polymers and thermosetting polymers by adding a flame retardant in production of the polymers or in production of molded products is widely used.

As the flame retardant, many compounds such as metal hydroxides, borates, organic halogenated compounds, phosphorus compounds such as phosphates, red phosphorus, organic phosphorus compounds etc. and organic nitrogen compounds are used. Among these, organic halogenated compounds, organic phosphorus compounds etc. exhibit an excellent flame retardant effect.

However, these halogen-containing compounds have a problem that they are pyrolyzed at the time of molding resin to generate hydrogen halide, to deteriorate the resin itself thus causing coloration, or to generate hydrogen halide on the occasion of a fire.

As a halogen-free flame retardant, an inorganic flame retardant such as aluminum hydroxide, magnesium hydroxide or the like is conventionally used. When only the inorganic compound is used, however, the flame retardant effect is low, and a large amount of the flame retardant is required to exhibit a sufficient effect, but when it is added in a large amount, physical properties inherent in resin may be deteriorated, and thus its application is limited.

As halogen-free flame-retardants exhibiting a relatively excellent flame retardant effect, there are specific organic phosphorus compounds and specific organic nitrogen compounds, and these are also often practically used.

The conventional organic phosphate flame retardant is represented by triphenyl phosphate (referred to hereinafter as "TPP"), but this compound is poor in heat resistance and highly volatile, and is thus not suitable for resin to be molded at high temperatures, and particularly because of pollution of a molding die, its application is limited.

As compounds used as flame retardants hardly volatilizing organic phosphorus, there are condensed phosphates described in JP-B 51-19858, JP-A 59-202240 etc. These compounds are superior to TPP in respect of heat resistance and low volatilization, but do not surpass TPP in flame retardant effect per unit weight of phosphorus, and therefore there is a problem that these should thus be added in a large amount, and thus the temperature of thermal deformation is significantly lowered due to the effect of the plasticizer for resin.

A large number of compositions using flame-retardants based on condensed polyphosphates such as ammonium polyphosphate and polyphosphoric amides are also proposed (JP-A54-22450, JP-A 9-316250 etc.). However, polyphosphoric acid absorbs water to reduce electrical resistance gradually due to water absorption and is thus not suitable as an insulating covering material for electric wire/cable etc., and therefore its application is limited.

To prevent nutrient enrichment in closed water systems in lakes and marshes, compositions substituted for phosphorus flame-retardants are also required in recent years.

Organic nitrogen compounds such as melamine also exhibit a relatively high flame retardant effect (JP-A 8-176343 etc.). However, these compounds have been often used in combination with the phosphorus flame retardant in order to achieve a higher flame retardant effect.

Accordingly, a second object of the present invention is to provide a polymer composition having high flame retardancy without containing a halogen- or phosphorus-based flame retardant, particularly a flame retardant polymer composition suitable as a covering material or sheath for electric wires.

DISCLOSURE OF INVENTION

The thermoplastic resin composition (Y) according to the present invention comprises:

(A) 20 to 64.9 wt % ethylene copolymer comprising (A-1) an ethylene/α-olefin copolymer consisting of ethylene and C3 to C10 α-olefin and (A-2) an ethylene polymer other than (A-1) in such a ratio that (A-1)/(A-2) is 20/80 to 100/0 by weight, (B) 35 to 70 wt % metal hydroxide, and (C) 0.1 to 30 wt % graft-modified ethylene polymer.

In the thermoplastic resin composition (Y), it is preferable that the graft-modified ethylene polymer (C) is a graft-modified product of unsaturated carboxylic acid or a derivative thereof.

In the thermoplastic resin composition (Y), it is preferable that the graft-modified ethylene polymer (C) is a graft-modified product of unsaturated carboxylic acid or a derivative thereof wherein the amount of the graft is 0.01 to 10 wt %.

In the thermoplastic resin composition (Y), it is preferable that the ethylene polymer before modification of the graft-modified ethylene polymer (C) of unsaturated carboxylic acid or a derivative thereof is an ethylene/α-olefin copolymer consisting of ethylene and C3 to C10 α-olefin, and the ethylene polymer before modification has the following properties:

(i) the density (ASTM D1505, 23° C.) is in the range of 857 to 890 kg/m$^3$, (ii) the melt flow rate (MFR$_2$) (ASTM D1238, loading 2.16 kg, 190° C.) under a loading of 2.16 kg at 190° C. is in the range of 0.1 to 20 g/10 min., and (iii) the index (Mw/Mn) of molecular-weight distribution evaluated by GPC is in the range of 1.5 to 3.5.

In the thermoplastic resin composition (Y), it is preferable that the ethylene/α-olefin copolymer (A-1) has the following properties:

(i) the density (ASTM D1505, 23° C.) is in the range of 855 to 910 kg/m$^3$, (ii) the melt flow rate (MFR$_2$) (ASTM D1238, loading 2.16 kg, 190° C.) under a loading of 2.16 kg at 190° C. is in the range of 0.1 to 100 g/10 min., and (iii) the index (Mw/Mn) of molecular-weight distribution evaluated by GPC is in the range of 1.5 to 3.5.

In the thermoplastic resin composition (Y), it is preferable that the ethylene/α-olefin copolymer (A-1) has the following properties:

(i) the density (ASTM D1505, 23° C.) is in the range of 857 to 890 kg/m$^3$, (ii) the melt flow rate (MFR$_2$) (ASTM D1238, loading 2.16 kg, 190° C.) under a loading of 2.16 kg at 190° C. is in the range of 0.1 to 20 g/10 min., and (iii) the index (Mw/Mn) of molecular-weight distribution evaluated by GPC is in the range of 1.5 to 3.5, (iv) the B value determined from $^{13}$C-NMR spectrum and the following equation is 0.9 to 1.5;

$$B \text{ value} = [POE]/(2 \cdot [PE][PO])$$

wherein [PE] is the molar fraction of a structural unit derived from ethylene in the copolymer, [PO] is the molar fraction of a structural unit derived from α-olefin in the copolymer, and [POE] is the ratio of the number of ethylene/α-olefin chains to the number of all dyad chains in the copolymer.

The polymer composition (Z) of the present invention preferably comprises:relative to (AA) 100 parts by weight of at least one polymer selected from a thermoplastic polymer (aa1) and a thermosetting polymer (aa2), in the ratio of (BB) 50 to 250 parts by weight of a metal hydroxide, (E) 0.1 to 40 parts by weight of a triazine ring containing compound, and (F) 0.1 to 40 parts by weight of a polyhydric alcohol.

In the polymer composition (Z), it is preferable that the thermoplastic polymer (aa1) is an ethylene polymer.

In the polymer composition (Z), it is preferable that the weight ratio of the polyhydric alcohol (F) to the triazine ring containing compound (E) is in the range of the following relationship (1):

$$(F)/(E) \geq 1 \tag{1}$$

The molded product of the present invention comprises the thermoplastic polymer (Y) or the polymer composition (Z).

In the present invention, the molded product is preferably an insulating material for electric wires. The molded product is preferably a sheath for electric wires.

BRIEF DESCRIPTION OF DRAWING

In FIG. 1, 1 is a chamber, 2 is an insulating electric wire, 3 is a kraft paper, 4 is absorbent cotton, and 5 is a burner. In FIG. 1, length a is 10 inches, length b is 17 inches, length c is 3 inches, distance d is 1.5 inches, angle θ1 is 70°, and angle θ2 is 20°.

BEST MODE FOR CARRYING OUT THE INVENTION

Figure 1:
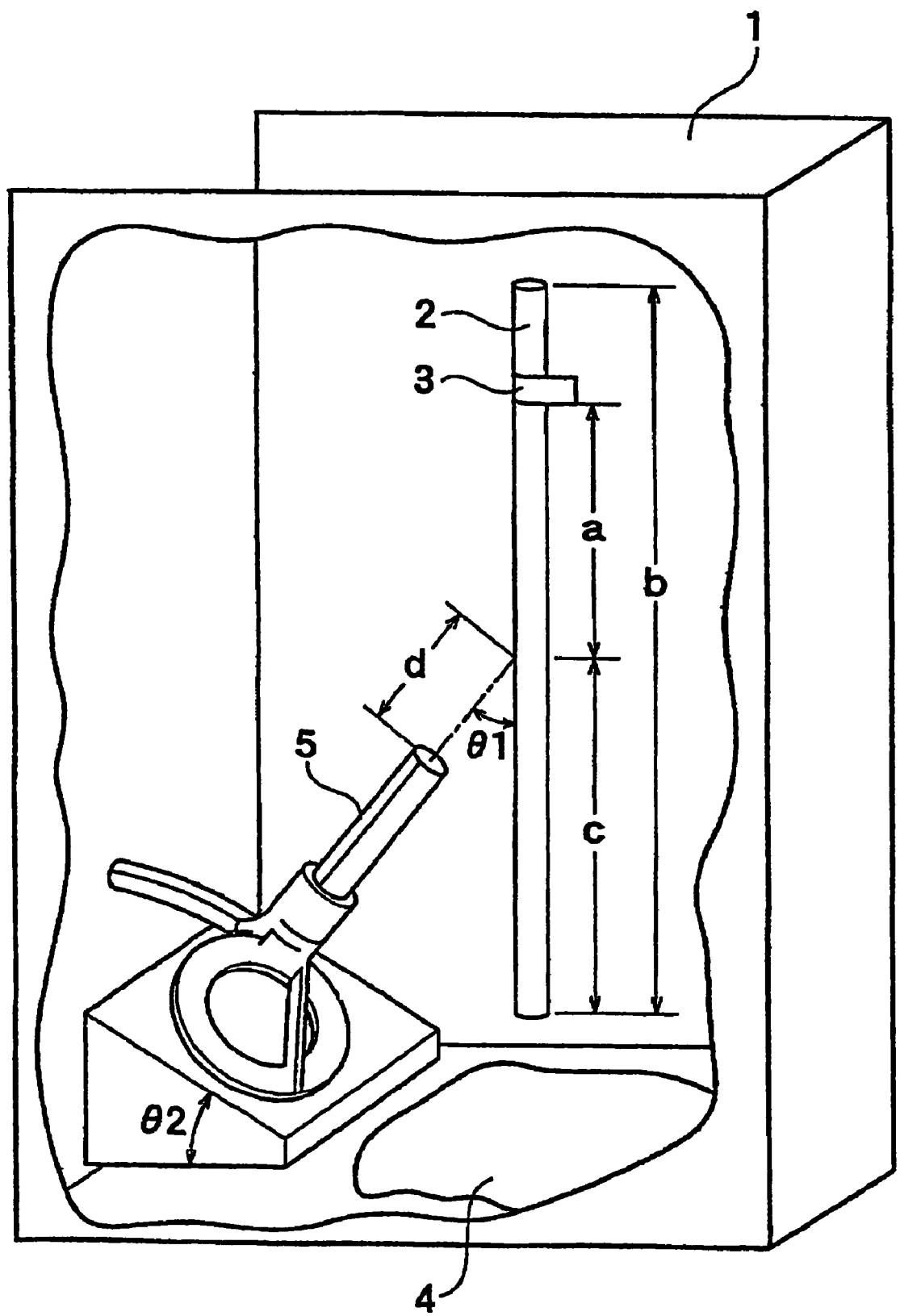
FIG. 1 is a perspective view of a partially cut section of a VW-1 flame test device prescribed in the UL standards.

Hereinafter, the thermoplastic resin composition (Y), polymer composition (Z), and a molded product comprising the composition, and its applications are specifically described.

[Thermoplastic Resin Composition (Y)]

The thermoplastic resin composition (Y) according to the present invention comprises:

(A) 20 to 64.9 wt % ethylene copolymer comprising (A-1) an ethylene/α-olefin copolymer consisting of ethylene and C3 to C10 α-olefin and (A-2) an ethylene polymer other than (A-1) in such a ratio that (A-1)/(A-2) is 20/80 to 100/0 by weight, (B) 35 to 70 wt % metal hydroxide, and (C) 0.1 to 30 wt % graft-modified ethylene polymer.

[(A) Ethylene Copolymer]

The ethylene copolymer of the present invention comprises the ethylene/α-olefin copolymer (A-1) and the ethylene polymer (A-2) other than (A-1) in such a ratio that (A-1)/(A-2) is 20/80 to 100/0, preferably 50/50 to 100/0, still more preferably 70/30 to 100/0 by weight. (A-1) and (A-2) constituting the ethylene copolymer (A) in the present invention may be contained in the thermoplastic resin composition (Y), and compositions may be first produced from (A-1) and (A-2) respectively and then used to produce the thermoplastic resin composition (Y), or (A-1) and (A-2) may be added separately in producing the thermoplastic resin composition (Y).

[(A-1) Ethylene/α-Olefin Copolymer]

The ethylene/α-olefin copolymer (A-1) used in the present invention is a copolymer consisting of ethylene and C3 to C10 α-olefin. The C3 to C10 α-olefin is specifically propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene 1-octene, 3-ethyl-1-hexene, 1-octene, 1-decene, etc. The copolymer is composed of ethylene and one or more of these olefins. Among these olefins, at least one of propylene, 1-butene, 1-hexene, and 1-octene is preferably used.

With respect to the content of each structural unit in the ethylene/α-olefin copolymer, it is preferable that the content of a structural unit derived from ethylene is usually 75 to 95 mol %, preferably 80 to 95 mol %, and the content of a structural unit derived from at least one compound selected from C3 to C10 α-olefins is usually 5 to 25 mol %, preferably 5 to 20 mol %.

The ethylene/α-olefin copolymer (A-1) used in the present invention preferably has the following properties:
(i) the density is 855 to 910 kg/cm³, preferably 857 to 890 kg/m³,
(ii) the melt flow rate (MFR$_2$) under a loading of 2.16 kg at 190° C. is in the range of 0.1 to 100 g/10 min., preferably 0.1 to 20 g/10 min.,
(iii) the index (Mw/Mn) of molecular-weight distribution evaluated by GPC is in the range of 1.5 to 3.5, preferably 1.5 to 3.0, more preferably 1.8 to 2.5, more preferably
(iv) the B value determined from $^{13}$C-NMR spectrum and the following equation is 0.9 to 1.5, preferably 1.0 to 1.2;

$$B\ value=[POE]/(2\cdot[PE][PO])$$

wherein [PE] is the molar fraction of a structural unit derived from ethylene in the copolymer, [PO] is the molar fraction of a structural unit derived from α-olefin in the copolymer, and [POE] is the ratio of the number of ethylene/α-olefin chains to the number of all dyad chains in the copolymer.

This B value is an indicator indicating the state of distribution of ethylene and C3 to C10 α-olefin in the ethylene/α-olefin copolymer, and can be determined on the basis of reports of J. C. Randall (Macromolecules, 15, 353 (1982)) and J. Ray (Macromolecules, 10, 773 (1977)).

A higher B value indicates that a block chain of the ethylene or α-olefin copolymer is shorter, the distribution of ethylene and α-olefin is more uniform, and the distribution of the copolymer rubber composition is narrower. When the B value is lower than 1.0, the ethylene/α-olefin copolymer tends to have a broader composition to deteriorate handling properties.
(v) The intensity ratio (Tαβ/Tαα) of Tαβ to Tαα in $^{13}$C-NMR spectrum is 0.5 or less, preferably 0.4 or less, more preferably 0.3 or less. Tαα and Tαβ in $^{13}$C-NMR spectrum each indicates a peak intensity of CH$_2$ in a structural unit derived from C3 or more α-olefin, and means two kinds of CH$_2$ different in position to the tertiary carbon, as shown below:

[Formula 1]

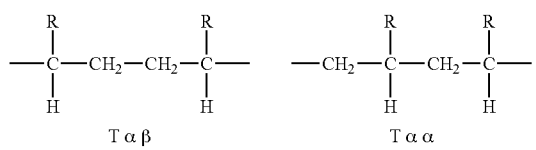

Such Tαβ/Tαα intensity ratio can be determined in the following manner. A $^{13}$C-NMR spectrum of the ethylene/α-olefin copolymer is measured for example by JEOL-GX270 NMR measuring instrument manufactured by JEOL, Ltd. A mixed solution of hexachlorobutadiene/d6-benzene (2/1) (volume by ratio) regulated at a sample concentration of 5 wt % is measured at 67.8 MHz at 25° C. with d6-benzene (128 ppm) as standard. The measured $^{13}$C-NMR spectrum is analyzed according to Lindemann Adams' proposal (Analysis Chemistry, 43, p. 1245 (1971)) and J. C. Randall (Review Macromolecular Chemistry Physics, C29, 201 (1989)) to determine the Tαβ/Tαα density ratio.

The ethylene/α-olefin copolymer of the present invention having not only the above properties but also the following property is also preferably used.
(vi) The ratio [MFR$_{10}$/MFR$_2$] of the melt flow rate (MFR$_{10}$) at 190° C. under a loading of 10 kg to the melt flow rate (MFR$_2$) at 190° C. under a loading of 2.16 kg satisfies the following relationships:

$$MFR_{10}/MFR_2 \geq 5.7$$

$$Mw/Mn+4.7 \leq MFR_{10}/MFR_2$$

When MFR$_{10}$, MFR$_2$, and Mw/Mn do not satisfy the above relationships, moldability and/or material strength may be lowered.

[Method of Producing the Ethylene/α-Olefin Copolymer (A-1)]

The ethylene/α-olefin copolymer (A-1) can be produced by copolymerizing ethylene with at least one C3 to C10 α-olefin in the presence of a metallocene catalyst or a Ziegler catalyst consisting of a V compound and an organoaluminum compound, and the metallocene catalyst is preferably used.

The metallocene catalyst may be formed from a metallocene compound (a), an organoaluminum oxy compound (b) and/or a compound (c) forming an ion pair by reacting with the metallocene compound (a), or may be formed from (a), (b) and/or (c) and an organoaluminum compound (d). Copolymerization of ethylene/α-olefin can be carried out in the presence of the above catalyst, usually in a liquid phase using a hydrocarbon solvent by a batch, semi-batch or continuous method. When the metallocene catalyst comprising the metallocene compound (a) and the organoaluminum oxy compound (b) or the ionized ionic compound (c) is used, the concentration of the metallocene compound (a) in the polymerization system is usually 0.00005 to 0.1 mmol/L (polymerization volume), preferably 0.0001 to 0.05 mmol/L. The organoaluminum oxy compound (b) is supplied in an amount of 1 to 10000, preferably 10 to 5000, in terms of the molar ratio of aluminum atom to the transition metal in the metallocene compound in the polymerization system. The ionized ionic compound (c) is supplied in an amount of 0.5 to 20, preferably 1 to 10, in terms of the molar ratio of the ionized ionic compound (c) to the metallocene compound (a) (ionized ionic compound (c)/metallocene compound (a)) in the polymerization system. When the organoaluminum compound is used, it is used in an amount of usually 0 to 5 mmol/L (polymerization volume), preferably about 0 to 2 mmol/L.

The copolymerization reaction is carried out usually at a reaction temperature of −20° C. to 150° C., preferably 0 to 120° C., more preferably 0 to 100° C. and at a pressure of 0 to 7.8 MPa (80 kgf/cm², gauge pressure), preferably 0 to 4.9 MPa (50 kgf/cm², gauge pressure).

Ethylene and α-olefin are supplied in such an amount that the ethylene/α-olefin copolymer (A-1) having the above specific composition is obtained. In copolymerization, a molecular-weight regulator such as hydrogen can also be used.

[Ethylene Polymer (A-2)]

The ethylene polymer (A-2) used in the present invention is an ethylene polymer other than (A-1), and includes linear low-density polyethylene, high-pressure low-density polyethylene, an ethylene/vinyl acetate copolymer, an ethylene/ethyl acrylate copolymer, an ethylene/methyl methacrylate copolymer, an ethylene/acrylic acid copolymer, an ethylene/methacrylic acid copolymer and an ionomer thereof, an ethylene/methacrylate copolymer, and an ethylene/C3 to C20 α-olefin/non-conjugated polyene copolymer. (A-2) is preferably an ethylene copolymer other than (A-1).

The ethylene copolymer (A) used in the present invention may be silane-grafted.

The silane-grafted ethylene copolymer (A) is prepared by using a vinyl silane compound in combination with a peroxide to promote silane grafting. In the present invention, the silane-grafted ethylene copolymer (A) can also be obtained by melt-mixing silane-ungrafted ethylene copolymer (A), metal hydroxide (B), a graft modified ethylene polymer (C) of unsaturated carboxylic acid or a derivative thereof, a vinylsilane compound, and a peroxide by various conventionally known methods. The resulting thermoplastic resin composition according to the present invention contains the formed silane-grafted ethylene copolymer (A).

Examples of the vinyl silane compound include γ-methacryloxypropyltrimethoxysilane, vinyltrimethoxysilane, vinyltriethoxysilane, vinyltributoxysilane vinyltris(β-methoxyethoxysilane), vinyltriacetoxysilane, methyltrimethoxysilane etc. Preferably among these are γ-methacryloxypropyltrimethoxysilane, vinyltrimethoxysilane, and vinyltriethoxysilane. The vinylsilane compound is used in an amount of usually 0.5 to 2.5 wt %, preferably 0.5 to 2 wt %, relative to the total amount (=100 wt %) of (A), (B) and (C). In other words, the vinylsilane compound is used in an amount of usually 0.5 to 2.5 parts by weight, preferably 0.5 to 2 parts by weight, relative to the total amount (=100 parts by weight) of (A), (B) and (C). When the vinylsilane compound is used in the above ratio, the rate of silane grafting is high, and a suitable degree of silane grafting is obtained, resulting in a molded product excellent in balance between tensile elongation and tensile break strength, for example a covering layer for electric wires.

In the present invention, the peroxide is used together with the vinylsilane compound in order to promote the silane grafting reaction of the ethylene copolymer (A).

The peroxide includes organic peroxides, and specific examples include benzoyl peroxide, dichlorobenzoyl peroxide, dicumyl peroxide, di-t-butyl peroxide, 2,5-dimethyl-2,5-di(peroxide benzoate) hexyne-3, 1,4-bis(t-butylperoxyisopropyl) benzene, lauroyl peroxide, t-butyl peracetate, 2,5-dimethyl-2,5-di-(t-butylperoxide) hexyne-3,2,5-dimethyl-2,5-di(t-butylperoxide) hexane, t-butyl perbenzoate, t-butyl perphenylacetate, t-butyl perisobutyrate, t-butylper-sec-octoate, t-butyl perpivalate, cumyl perpivalate, t-butyl perdiethylacetate; azobisisobutyronitrile, dimethylazoisobutyrate etc.

Among these compounds, dialkyl peroxides such as dicumyl peroxide, di-t-butyl peroxide, 2,5-dimethyl-2,5-di (t-butylperoxy) hexyne-3, 2,5-dimethyl-2,5-di(t-butylperoxy) hexane and 1,4-bis(t-butylperoxyisopropyl) benzene are preferably used.

The peroxide is used in an amount of usually 0.005 to 0.15 wt %, preferably 0.01 to 0.1 wt %, relative to the total (=100 wt %) of (A)+(B)+(C). In other words, the peroxide is used in an amount of usually 0.005 to 0.15 part by weight, preferably 0.01 to 0.1 part by weight, relatioe to the total (=100 parts by weight) of (A)+(B)+(C). When the peroxide is used in this range, the reaction for silane-grafting of the vinylsilane compound to the ethylene copolymer (A) can be suitably promoted.

[Metal Hydroxide (B)]

The metal hydroxide used in the present invention includes aluminum hydroxide, magnesium hydroxide, calcium hydroxide, barium hydroxide, manganese hydroxide, zinc hydroxide, hydrotalcite, and a mixture thereof, among which magnesium hydroxide or a mixture containing magnesium hydroxide is particularly preferable.

[Graft Modified Ethylene Polymer (C)]

The ethylene polymer used as the material of the graft modified ethylene polymer in the present invention is preferably an ethylene/α-olefin copolymer. The ethylene/α-olefin copolymer used as the material of the graft modified ethylene polymer is preferably an ethylene/C3 to C10 α-olefin copolymer. The C3 to C10 α-olefin is specifically propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-pentene 4-ethyl-1-hexene, 1-octene, 3-ethyl-1-hexene, 1-octene, 1-decene, etc. These may be used alone or in combination two or more thereof. Among these olefins, at least one of propylene, 1-butene, 1-hexene, and 1-octene is preferably used.

With respect to the content of each structural unit in the ethylene copolymer, it is preferable that the content of a structural unit derived from ethylene is usually 75 to 95 mol %, preferably 80 to 95 mol %, and the content of a structural unit derived from at least one compound selected from C3 to C10 α-olefins is usually 5 to 25 mol %, preferably 5 to 20 mol %.

The ethylene/α-olefin copolymer used in graft modification preferably has the following physical properties:
(i) the density is 855 to 910 kg/m$^3$, preferably 857 to 890 kg/m$^3$,
(ii) the melt flow rate (MFR$_2$) under a loading of 2.16 kg at 190° C. is in the range of 0.1 to 100 g/10 min., preferably 0.1 to 20 g/10 min.,
(iii) the index (Mw/Mn) of molecular-weight distribution evaluated by GPC is in the range of 1.5 to 3.5, preferably 1.5 to 3.0, more preferably 1.8 to 2.5,
more preferably,
(iv) the B value determined from $^{13}$C-NMR spectrum and the following equation is 0.9 to 1.5, preferably 1.0 to 1.2;

$$B \text{ value}=[POE]/(2\cdot[PE][PO])$$

wherein [PE] is the molar fraction of a structural unit derived from ethylene in the copolymer, [PO] is the molar fraction of a structural unit derived from α-olefin in the copolymer, and [POE] is the ratio of the number of ethylene/α-olefin chains to the number of all dyad chains in the copolymer.

The ethylene/α-olefin copolymer used as the material of the graft-modified ethylene polymer is preferably the one having the same characteristics as those described in the ethylene/α-olefin copolymer used in (A-1), but the comonomer species, density, molecular weight etc. of the copolymer may be the same as or different from those of (A-1).

The graft-modified ethylene polymer according to the present invention is obtained by graft-modification of the ethylene copolymer with a vinyl compound having at least one kind of polar group. The vinyl compound having a polar group includes vinyl compounds having oxygen-containing groups such as acid, acid anhydride, ester, alcohol, epoxy and ether as polar groups, vinyl compounds having nitrogen-containing groups such as isocyanate and amide, and vinyl compounds having silicon-containing groups such as vinyl silane.

Among these compounds, vinyl compounds having oxygen-containing groups are preferable, and unsaturated epoxy monomers, unsaturated carboxylic acids and derivatives are preferable.

The unsaturated epoxy monomers include unsaturated glycidyl ethers, unsaturated glycidyl esters (for example glycidyl methacrylate) etc.

Examples of the unsaturated carboxylic acids include acrylic acid, maleic acid, fumaric acid, tetrahydrophthalic acid, itaconic acid, citraconic acid, crotonic acid, isocrotonic acid and nadic acid™ (endo-cis-bicyclo[2,2,1]hept-5-ene-2,3-dicarboxylic acid) etc.

Derivatives of the unsaturated carboxylic acids include, for example, acid halide compounds, amide compounds, imide compounds, acid anhydrides, and ester compounds of the unsaturated carboxylic acids. Specific examples include malenyl chloride, maleimide, maleic anhydride, citraconic anhydride, monomethyl maleate, dimethyl maleate, glycidyl maleate etc.

Among these compounds, unsaturated dicarboxylic acids or acid anhydrides thereof are preferable, and particularly maleic acid, nadic acid™ or acid anhydrides thereof are preferable. The graft position of the unsaturated carboxylic acid or its derivative grafted onto the unmodified ethylene copolymer is not particularly limited, and the unsaturated carboxylic acid or its derivative may be bound to an arbitrary carbon atom in the ethylene polymer constituting the graft-modified ethylene polymer.

The graft-modified ethylene polymer (C) can be prepared by conventionally known methods, for example by the following methods.

(1) A method of graft copolymerization by melting the unmodified ethylene polymer in an extruder and then adding unsaturated carboxylic acid etc.
(2) A method of graft copolymerization by dissolving the unmodified ethylene polymer in a solvent and adding unsaturated carboxylic acid etc.

In both methods, the graft reaction is conducted preferably in the presence of a radical initiator for efficient graft copolymerization of graft monomers such as the unsaturated carboxylic acid etc.

An organic peroxide, an azo compound or the like is used as the radical initiator. Examples of the radical initiator include organic peroxides such as benzoyl peroxide, dichlorobenzoyl peroxide and dicumyl peroxide, and azo compounds such as azobisisobutyronitrile and dimethyl azoisobutyrate. Preferably used among these are dialkyl peroxides such as dicumyl peroxide, di-tert-butyl peroxide, 2,5-dimethyl-2,5-di(tert-butyl peroxy)hexyn-3,2,5-dimethyl-2,5-di(tert-butylperoxy)hexane, and 1,4-bis(tert-butylperoxyisopropyl) benzene.

The radical initiator is used in an amount of usually 0.001 to 1 part by weight, preferably 0.003 to 0.5 part by weight, more preferably 0.05 to 0.3 part by weight, relative to 100 parts by weight of the unmodified ethylene polymer.

The reaction temperature in the graft reaction using the radical initiator or in the graft reaction without using the radical initiator is determined in the range of usually 60 to 350° C., preferably 150 to 300° C.

[Other Additives]

The thermoplastic resin composition of the present invention can be blended if necessary with additives such as an antioxidant, a UV absorber, a weatherability stabilizer, a heat stabilizer, an antistatic, a flame retardant, a pigment, a dye, a lubricant etc. in addition to those described above. The amount of each additive may be determined depending on the object. For example, when a flame retardant represented by silicone resin is used, it can be used usually in an amount of about 0.1 to 10 parts by weight relative to 100 parts by weight of (A), (B) and (C) in total.

[Thermoplastic Resin Composition]

The content of each component in the thermoplastic resin composition of the present invention is as follows: The lower limit of the ethylene copolymer (A) is 20 wt %, preferably 25 wt %, more preferably 30 wt %, and the upper limit is 64.9 wt %, preferably 60 wt %, more preferably 59.9 wt %, still more preferably 55 wt %. The lower limit of the metal hydroxide (B) is 35 wt %, preferably 40 wt %, and the upper limit is 70 wt %. The lower limit of the graft-modified ethylene polymer (C) is 0.1 wt %, and the upper limit is 30 wt %, preferably 10 wt %, more preferably 6 wt %. Specifically, the ethylene copolymer (A) is for example 20 to 64.9 wt %, preferably 25 to 60 wt %, more preferably 30 to 55 wt %, the metal hydroxide (B) is 35 to 70 wt %, preferably 40 to 70 wt %, the graft-modified ethylene polymer (C) is 0.1 to 30 wt %, preferably 0.1 to 10 wt %, more preferably 0.1 to 6 wt % (it is assumed that (A)+(B)+(C)=100 wt %).

When the total of (A), (B) and (C) is 100 parts by weight, it is preferable in the present invention that triazine ring containing compound (E) described later is added in an amount of 0.1 to 20 parts by weight, and polyhydric alcohol (F) is added in an amount of 0.1 to 20 parts by weight. The triazine ring containing compound (E) is a compound containing a triazine ring, and includes melamine, ammeline, melam, benzoguanamine, acetoguanamine, phthalodiguanamine, melamine cyanurate, pyrophosphoric melamine, butylene diguanamine, norbornane diguanamine, methylene dimelamine, ethylene dimelamine, trimethylene dimelamine, tetramethylene dimelamine, hexamethylene dimelamine, 1,3-hexylene dimelamine etc., among which melamine cyanurate is particularly preferable.

The polyhydric alcohol (F) includes pentaerythritol, dipentaerythritol, tripentaerythritol, polypentaerythritol, trishydroxyethyl isocyanate, polyethylene glycol, glycerin, starch, glucose, cellulose, sorbitol etc.

When the weight ratio ((E)/(F)) of the triazine ring containing compound (E) to the polyhydric alcohol (F) is 1 or more, the flame retardant effect is further improved.

The thermoplastic resin composition (Y) according to the present invention is prepared by melt-mixing the above-mentioned components (A), (B) and (C) and additives blended if necessary by a wide variety of conventionally known methods.

The thermoplastic resin composition is obtained for example by mixing the above components simultaneously or successively in a Henschel mixer, V-type blender, tumbler mixer, ribbon blender etc. and then melt-kneading the mixture by a single-screw extruder, multiple screw extruder, kneader, Banbury mixer etc.

When the multiple screw extruder, kneader or Banbury mixer particularly excellent in kneading performance is used, a high-quality polymer composition wherein the respective components are dispersed more uniformly can be obtained.

Further, the additives for example an oxidant etc. can be added if necessary in an arbitrary stage.

[Polymer Composition (Z)]

Then, the polymer composition (Z) according to the present invention is described.

The polymer composition (Z) according to the present invention comprises:relative to (AA) 100 parts by weight of at least one polymer selected from a thermoplastic polymer (aa1) and a thermosetting polymer (aa2), in the ratio of (BB) 50 to 250 parts by weight of a metal hydroxide, (E) 0.1 to 40 parts by weight of a triazine ring containing compound, and (F) 0.1 to 40 parts by weight of a polyhydric alcohol.

The polymer (AA) used in the polymer composition of the present invention is at least one kind of polymer selected from thermoplastic polymer (aa1) and thermosetting polymer (aa2). These can be used alone or as a blend of two or more thereof.

[Thermoplastic Polymer (aa1)]

The thermoplastic polymer includes olefin polymers such as ethylene polymer, propylene polymer, polybutene, poly-4-methyl-1-pentene etc.; styrene block copolymers; polyvinyl acetate; acryl polymers such as polyacrylate, polyacrylonitrile etc.; polyethers such as polyphenylene oxide, polyethylene oxide etc.; polyesters such as PET etc.; polyurethane; polyamide; polyphenylene sulfide; ABS resin; polycarbonate; graft-modified olefin polymers etc. These can be used alone or as a blend of two or more thereof. In particular, the ethylene polymers and styrene block copolymers are preferable.

The ethylene polymers include an ethylene/α-olefin copolymer, ethylene/vinyl acetate copolymer, ethylene/ethyl acrylate copolymer, ethylene/methyl methacrylate copolymer, ethylene/acrylic acid copolymer, ethylene/methacrylic acid copolymer and ionomers thereof, an ethylene/methacrylate copolymer, graft-modified ethylene/α-olefin copolymer etc. The structure of the molecule may be linear or may be branched with a long or short chain. These polymers may be a mixture thereof with polyethylene.

The ethylene/α-olefin copolymer is an ethylene/α-olefin random copolymer wherein the α-olefin used as comonomer is C3 to C20, preferably C3 to c10, α-olefin. Examples of the α-olefin include propylene, 1-butene, 1-pentene, 1-hexene, 4-methylpentene-1,1-octene, 1-decene, 1-dodecene, and a combination thereof, among which propylene, 1-butene, 1-hexene, and 1-octene are preferable. If necessary, other comonomers, for example dienes such as 1,6-hexadiene, 1,8-octadiene, 5-ethylidene-2-norbornene and dicyclopentadiene, cyclic olefins such as cyclopentane, etc. may be contained in a small amount. The content of ethylene in the copolymer is 30 to 99.9 (mol %), preferably 50 to 99.5 (mol %), more preferably 75 to 99.5 (mol %).

The method of producing the ethylene polymer is not particularly limited, and the ethylene polymer can be produced by homopolymerization of ethylene or copolymerization of ethylene with α-olefin by using a radical polymerization catalyst, Philips catalyst, Ziegler-Natta catalyst, or metallocene catalyst.

As the ethylene polymer used in the polymer composition (Z) of the present invention, an ethylene/α-olefin copolymer which can be used as the component (A-1) in the thermoplastic resin composition (Y) is preferably used.

The styrene block copolymer includes a styrene/butylene/styrene block copolymer, styrene/isoprene/styrene block copolymer, styrene/ethylene/butylene/styrene block copolymer, styrene/ethylene/propylene/styrene block copolymer, styrene/butadiene/styrene block copolymer and hydrogenated products thereof.

[Thermosetting Polymer (aa2)]

The thermosetting polymer of the present invention includes phenol resin, urine resin, melamine resin, unsaturated polyester, epoxy resin, polyurethane, silicone resin etc. These can be used alone or as a blend of two or more thereof.

[Metal Hydroxide (BB)]

The metal hydroxide in the present invention includes aluminum hydroxide, magnesium hydroxide, calcium hydroxide, barium hydroxide, manganese hydroxide, zinc hydroxide, hydrotalcite etc. These metal hydroxides may be used alone or as a mixture thereof, and magnesium hydroxide alone or a magnesium hydroxide-containing mixture is particularly preferable.

[Triazine Ring Containing Compound (E)]

The triazine ring containing compound in the present invention is a compound containing a triazine ring, and includes melamine, ammeline, melam, benzoguanamine, acetoguanamine, phthalodiguanamine, melamine cyanurate, pyrophosphoric melamine, butylene diguanamine, norbornene diguanamine, methylene dimelamine, ethylene dimelamine, trimethylene dimelamine, tetramethylene dimelamine, hexamethylene dimelamine, 1,3-hexylene dimelamine etc., among which melamine cyanurate is particularly preferable.

[Polyhydric Alcohol (F)

The polyhydric alcohol in the present invention includes pentaerythritol, dipentaerythritol, tripentaerythritol, polypentaerythritol, trishydroxyethyl isocyanate, polyethylene glycol, glycerin, starch, glucose, cellulose, sorbitol etc.

[Other Additives]

The polymer composition of the present invention can be blended if necessary with additives such as an antioxidant, a UV absorber, a weatherability stabilizer, a heat stabilizer, an antistatic, a flame retardant, a pigment, a dye, a lubricant etc. in addition to those described above.

[Polymer Composition]

The polymer composition (Z) of the present invention comprises relative to (AA) 100 parts by weight of at least one polymer selected from a thermoplastic polymer (aa1) and a thermosetting polymer (aa2), in the ratio of (BB) 50 to 250 parts by weight, preferably 70 to 200 parts by weight of a metal hydroxide, (E) 0.1 to 40 parts by weight, preferably 10 to 30 parts by weight of a triazine ring containing compound, and (F) 0.1 to 40 parts by weight, preferably 10 to 30 parts by weight of a polyhydric alcohol.

When the weight ratio ((F)/(E)) of the polyhydric alcohol (F) to the triazine ring containing compound (E) is 1 or more, the flame retardant effect is further improved.

The polymer composition (Z) according to the present invention is prepared in various known methods by melt-mixing the above components (AA), (BB), (E) and (F) and additives blended if necessary.

The polymer composition according to the present invention is obtained for example by mixing the above components simultaneously or successively in a Henschel mixer, V-type blender, tumbler mixer, ribbon blender etc. and then melt-kneading the mixture by a single-screw extruder, multiple screw extruder, kneader, Banbury mixer etc.

When the multiple screw extruder, kneader or Banbury mixer which is particularly excellent in kneading performance is used, a high-quality polymer composition wherein the respective components are dispersed more uniformly can be obtained.

Further, the additives for example an oxidant etc. can be added if necessary in an arbitrary stage.

[Molded Product Comprising the Thermoplastic Resin Composition (Y) or the Polymer Composition (Z)]

The molded product of the present invention can be produced by forming the thus obtained thermoplastic resin composition (Y) or the polymer composition (Z) according to the present invention in various shapes by conventionally known melt-molding methods such as extrusion molding, rotational molding, calender molding, injection molding, compression molding, transfer molding, powder molding, blow molding and vacuum molding.

When the thermoplastic resin composition (Y) or the polymer composition (Z) according to the present invention is used in various applications for example to a cover for electric wires, such as a sheath or an insulating material for electric wires, the molded product of the present invention is a covering layer such as a sheath or an insulating material for electric wires, and this covering layer such as a sheath or an insulating material for electric wires is formed around an electric wire by a conventionally known method such as extrusion.

EXAMPLES

Hereinafter, the present invention is described in more detail by reference to the Examples, but the present invention is not limited to the Examples.

Physical properties of the ethylene/α-olefin copolymer (A-1) and Tafmer™ T A described later were evaluated in the following manner.

(1) Density

A strand after measurement of MFR at 190° C. under a loading of 2.16 kg was heat-treated at 120° C. for 1 hour, then cooled over 1 hour to room temperature and measured by a density gradient tube method.

(2) α-Olefin Content, Tαβ/Tαα, B value

Determined by $^{13}$C-NMR spectrum.

(3) Intrinsic Viscosity [η]

Determined at 135° C. in decalin.

(4) Mw/Mn

Determined at 140° C. in an o-dichlorobenzene solvent by GPC (gel permeation chromatography).

(5) $MFR_{10}/MFR_2$ $MFR_{10}$ at 190° C. under a loading of 10 kg and $MFR_2$ at 190° C. under a loading of 2.16 kg according to ASTMD-1238 were measured, and the $MFR_{10}/MFR_2$ ratio was calculated. A higher ratio indicates higher fluidity of the polymer upon melting, that is, higher processability.

Preparation of an insulating wire sample and evaluation thereof were conducted by the following methods.

(6) Break Strength and Elongation at Break

According to JIS K6301, a tensile test was conducted by Dumbbell JIS No. 3 with a span of 20 mm at a stress rate of 200 mm/min., to determine break strength and elongation at break.

(7) Torsional Rigidity

According to JISK6745, torsional rigidity at a temperature of 23° C. was measured by using a Clash-Berg testing machine manufactured by Toyo Seiki.

(8) Scratch Resistance

Using a Martens scratch hardness testing machine manufactured by Tokyo Shoki, a test specimen of 3 mm in thickness was loaded with a tensile indenter of 20 g, then scratched, and measured for the width of a groove occurring upon scratching, and the reciprocal of the width was calculated to determine scratch resistance. When the measurement was 11 or more, ○ was given; when the measurement was 10 to 11, Δ was given; and when the measurement was less than 10, x was given.

(9) Whitening on Bending

A test specimen of 2 mm in thickness was fixed at one end and then bent vertically an angle of at least 120° at a position apart by 3 cm from the other end, and whether whitening on bending occurred or not was confirmed with naked eyes. The sample not whitened was given o, and the whitened sample was given x.

(Preparation of Ethylene/1-Butene Copolymer)

Production Example 1

(Preparation of Catalyst Solution)

0.63 mg bis(1,3-dimethylcyclopentadienyl)zirconium dichloride was introduced into a glass flask purged sufficiently with nitrogen, and 1.57 ml methyl aminoxane in toluene (Al, 0.13 mM), and 2.43 ml toluene were added thereto to give a catalyst solution.

(Preparation of Ethylene/1-Butene Copolymer a-1)

A stainless steel autoclave having an internal volume of 2 L sufficiently purged with nitrogen was charged with 912 ml hexane and 200 ml 1-butene, and the temperature in the system was increased to 80° C. Subsequently, 0.9 mmol triisobutyl aluminum and 2.0 ml of the catalyst solution prepared above (0.0005 mmol in terms of Zr) were injected with ethylene to initiate polymerization. While the total pressure was kept at 8.0 kg/cm$^2$-G by continuously feeding hydrogen at a rate of 70 ml/hr. and ethylene, the mixture was polymerized at 80° C. for 30 minutes.

After the polymerization was terminated by adding a small amount of ethanol into the system, the unreacted ethylene was purged. The resulting polymer was poured into a large excess of methanol, whereby the polymer was precipitated. This polymer was recovered by filtration and dried overnight under reduced pressure, to give an ethylene/1-butene copolymer. The states of the resulting ethylene/1-butene copolymer are shown in Table 1.

TABLE 1

| States of the polymer | Ethylene 1-butene copolymer a-1 |
|---|---|
| Density (kg/m$^3$) | 885 |
| Melt flow rate | 1.2 |
| Mw/Mn | 2.0 |
| $MFR_{10}/MFR_{2.16}$ | 5.8 |

Production Example 2

(Preparation of Catalyst Solution)

18.4 mg of triphenyl carbenium (tetrakispentafluorophenyl) borate was dissolved in 5 ml toluene to prepare a toluene solution at a concentration of 0.004 mM/ml. 1.8 mg of [dimethyl(t-butylamide) (tetramethyl-η$^5$-cyclopentadienyl)silane]titanium dichloride was dissolved in 5 ml toluene to prepare a toluene solution at a concentration of 0.001 mM/ml. At the time of polymerization, 0.38 ml toluene solution of triphenyl carbonium (tetrakispentafluorophenyl)

borate and 0.38 ml toluene solution of [dimethyl(t-butylamide) (tetramethyl-η⁵-cyclopentadienyl) silane]titanium dichloride, were mixed with 4.24 ml diluting toluene, to prepare 5 ml toluene solution of triphenyl carbenium (tetrakispentafluorophenyl) borate at a concentration of 0.002 mM/L in terms of B [dimethyl(t-butylamide)(tetramethyl-η⁵-cyclopentadienyl)silane]titanium dichloride at 0.0005 mM/L in terms of Ti.

(Preparation of Ethylene/1-Butene Copolymer a-2)

750 ml heptane was introduced at 23° C. into a 1.5-L SUS autoclave equipped with a stirring blade and purged sufficiently with nitrogen. This autoclave was charged under cooling on ice with 10 g 1-butene and 120 ml hydrogen with a stirring blade. Then, the autoclave was heated to 100° C., and further pressurized with ethylene such that the total pressure was increased to 6 KG. When the internal pressure in the autoclave reached 6 KG, 1.0 ml of 1.0 mM triisobutyl aluminum (TIBA) in hexane was injected with nitrogen. Subsequently, 5 ml catalyst solution prepared above was injected with nitrogen into the autoclave to initiate polymerization. Thereafter, the temperature was regulated for 5 minutes such that the inner temperature of the autoclave was 100° C., while ethylene was directly fed to attain a pressure of 6 kg. Five minutes after the polymerization was initiated, 5 ml methanol was introduced by a pump into the autoclave to terminate the polymerization, and the autoclave was depressurized to the atmospheric pressure. 3 L methanol was poured into the reaction solution under stirring. The resulting polymer containing the solvent was dried at 130° C. for 13 hours at 600 Torr, to give 10 g ethylene/butene copolymer a-2. The states of the resulting ethylene/1-butene copolymer are shown in Table 2.

TABLE 2

| States of the polymer | Production Example 2<br>Ethylene/1-butene<br>Copolymer<br>a-2 |
|---|---|
| Density (kg/m³) | 885 |
| Melt flow rate | 1.2 |
| Mw/Mn | 2.1 |
| MFR₁₀/MFR₂.₁₆ | 10.0 |
| B value | 1.1 |
| Tαβ/Tαα | 0.3 |

(Preparation of Maleic Anhydride Graft Modified Ethylene/1-Butene Copolymer)

Preparation Example 3

10 kg of the ethylene/1-butene copolymer, and a solution of 50 g maleic anhydride and 3 g di-tert-butyl peroxide dissolved in 50 g acetone, were blended in a Henschel mixer.

Then, the blend thus obtained was introduced via a hopper into a single-screw extruder having a screw diameter of 40 mm and a L/D ratio of 26, extruded into a strand at a resin temperature of 260° C. at a throughput of 6 kg/hr., then cooled with ice, and pelletized to give a maleic anhydride graft modified ethylene/1-butene copolymer.

From the resulting graft modified ethylene/1-butene copolymer, the unreacted maleic anhydride was extracted with acetone, and as a result of measurement of the amount of the maleic anhydride graft in this graft modified ethylene/1-butene copolymer, the amount of the graft was 0.43 wt %.

Examples Y1-1, Y1-2 and Y2, Comparative Examples Y1-1, Y1-3, Y1-4, Y2-1 and Y2-2

In Examples Y1-1, Y1-2 and Y2 and Comparative Examples Y1-1, Y1-3, Y1-4, Y2-1 and Y2-2, the ethylene/1-butene copolymer a-2 prepared ;by the above-described method was used as the ethylene copolymer (A); magnesium hydroxide was used as the metal hydroxide; and as the graft modified ethylene polymer of unsaturated carboxylic acid or a derivative thereof, modified ethylene polymers obtained by modifying, in the amount of the graft described shown in Table 3, the unmodified copolymers and unmodified polyethylene described in Examples Y1-1, Y1-2 and Y2 and Comparative Examples Y1-1, Y1-3, Y1-4, Y2 -1 and Y2-2 were used, and these materials were blended in the amounts (wt %) shown in the table, and melt-kneaded and pelletized at a resin temperature of 1 900C to give pellets of each thermoplastic resin composition. Physical properties of this thermoplastic resin composition were evaluated by the methods described above. The results are shown in Table 3.

The unmodified copolymers described in Examples Y1-1 and Y2 are the ethylene/1-butene copolymer a-1 prepared by the method described above. The unmodified copolymer described in Example Y1-2 is the ethylene/1-butene copolymer a-2 prepared by the method described above.

TABLE 3

| | | | Example Y1-1 | Example Y1-2 | Comparative Example Y1-1 | Comparative Example Y1-3 | Comparative Example Y1-4 | Example Y2 | Comparative Example Y2-1 | Comparative Example Y2-2 |
|---|---|---|---|---|---|---|---|---|---|---|
| (A-1) Ethylene/a-olefin copolymer | Type | | a-2 | a-2 | a-2 | a-2 | a-2 | a-2 | a-2 | a-2 |
| Unmodified copolymer as a material of modified polymer (C) | Type | | a-1 | a-2 | — | — | — | a-1 | — | — |
| | Content of 1-butene | mol % | 12 | 12 | — | — | — | 12 | — | — |
| | Intrinsic viscosity | dl/g | 1.5 | 1.5 | — | — | — | 1.5 | — | — |
| | Glass transition temperature | ° C. | −50 | −50 | — | — | — | −50 | — | — |
| | Degree of Crystallization | % | 10 | 10 | — | — | — | 10 | — | — |
| | B value | | 1.5 | 1.1 | — | — | — | 1.5 | — | — |
| | Density | kg/m³ | 885 | 885 | — | — | — | 885 | — | — |

TABLE 3-continued

|  |  |  | Example Y1-1 | Example Y1-2 | Comparative Example Y1-1 | Comparative Example Y1-3 | Comparative Example Y1-4 | Example Y2 | Comparative Example Y2-1 | Comparative Example Y2-2 |
|---|---|---|---|---|---|---|---|---|---|---|
| Unmodified PE as material of modified polymer (C) | Density | kg/m³ | — | — | — | 965 | 920 | — | 965 | 920 |
| (C) Modified polymer | Amount of charged MAH (unmodified copolymer: 100 wt) | wt % | 0.5 | 0.5 | — | 0.5 | 0.5 | 0.5 | 0.5 | 0.5 |
|  | Amount of graft MAH | wt % | 0.43 | 0.44 | — | 0.43 | 0.43 | 0.43 | 0.43 | 0.43 |
| Composition | A-1 | wt % | 36 | 36 | 36 | 36 | 36 | 36 | 36 | 36 |
|  | (B) Magnesium hydroxide | wt % | 60 | 60 | 60 | 60 | 60 | 60 | 60 | 60 |
|  | Silicone resin | wt % | 3 | 3 | 3 | 3 | 3 | 3 | 3 | 3 |
|  | (C) Modified polymer | wt % | 1 | 1 | — | 1 | 1 | 3 | 3 | 3 |
| Physical properties of composition | Break strength | MPa | 9 | 9 | 8 | 8 | 8 | 10 | 7 | 7 |
|  | Elongation at break | % (between gages) | 700 | 710 | 700 | 620 | 640 | 630 | 550 | 570 |
|  | Torsional rigidity | MPa | 30 | 29 | 29 | 44 | 40 | 36 | 50 | 45 |
|  | Scratch resistance | ○, Δ, x | ○ | ○ | x | ○ | ○ | ○ | ○ | ○ |
|  | Whitening on bending | ○, x | ○ | ○ | x | ○ | ○ | ○ | ○ | ○ |

Examples Z1 to Z6, Comparative Examples Z1 to Z12

An ethylene copolymer (trade name: Tafmer™A-1085; density, 885 kg/m³; MFR at 190° C. under a loading of 2.16 kg: 1.2 g/10 min. produced by Mitsui Chemicals), magnesium hydroxide, melamine cyanurate, pentaerythritol and zinc borate were blended in the weight parts shown in Table 4, and melt-kneaded and pelletized at a resin temperature of 190° C. in a Banbury mixer, to give pellets of a polymer composition.

The polymer composition was applied to a thickness of 0.8 mm around a conductor (outer diameter: 1.35 mm) of 7 twisted soft copper yarns each having a yarn stock diameter of 0.45 mm, at a dice temperature of 220° C. at a screw revolution of 30 rpm at a throughput of 1.6 to 1.8 kg/hr in a melt-extruder (Laboplast Mill manufactured by Toyo Seiki) having an electric wire coating dice arranged therein, whereby an insulating electric wire sample having a diameter of 3.0 mm was obtained.

[Vertical Flame Test (VW-1)]

The flame retardancy of the resulting insulating covering on the insulating wire sample was evaluated by the VW-1 vertical flame test stipulated in the above-mentioned UL standards. As shown in FIG. 1, the insulating wire 2 of 17 inches in length was vertically arranged as the sample in chamber 1 in the test device, and a kraft paper 3 was stuck to a part apart by 13 inches from the lower end, and adsorbent cotton 4 was placed below the insulating electric wire 2.

Then, a burner 5 arranged before the insulating electric wire 2 was ignited, and the flame was allowed 5 times to approach, at an angle of 70° for 15 seconds, a part apart by 3 inches from the lower end of the insulating electric wire 2, as shown by the dotted line in FIG. 1, and after approaching the flame each time, the time (sec.) elapsed until the flame spreading to the insulating covering was extinguished after the flame of the burner 5 was extinguished was determined, and the maximum flaming time was recorded.

Then, the above test was conducted 3 times, and a sample satisfying any of the following conditions (1) to (3) was evaluated to be excellent in flame retardancy (passing the test), while a sample failing to satisfy any one of the conditions was evaluated to be inferior in flame retardancy (not passing the test): (1) the maximum flaming time in the 3 measurements was 60 seconds or less, (2) the kraft paper 3 was not burned by the flame spreading from the insulating covering, and (3) the absorbent cotton 4 did not burn by a dropped burning material. For the rank of flame retardancy, a sample satisfying two of the above 3 conditions was given (Δ), a sample satisfying one of the 3 conditions was given (▲), and a sample satisfying none of the 3 conditions was given (x). The results are shown in Table 4.

It can be expected that the sample failing to pass the test can pass the test by increasing the thickness of the covering, depending on the rank of flame retardancy. Accordingly, the sample (Δ) can be expected to pass the test by slightly increasing the thickness of the covering, while the samples (▲) and (x) should have a considerable thicker covering.

TABLES 4

Conductor: number of yarns in wire/yarn diameter (mm) = 7/0.45, outer diameter = 1.35 mm, finishing diameter = 3.0 mm

| | Comparative Example Z1 | Comparative Example Z2 | Comparative Example Z3 | Comparative Example Z4 | Comparative Example Z5 | Comparative Example Z6 | Comparative Example Z7 | Example Z1 | Example Z2 | Example Z3 |
|---|---|---|---|---|---|---|---|---|---|---|
| A-1085 | 100 | 100 | 100 | 100 | 100 | 100 | 100 | 100 | 100 | 100 |
| $Mg(OH)_2$ | 170 | 170 | 170 | 170 | 170 | 170 | 170 | 170 | 170 | 170 |
| Melamine cyanurate | | | 10 | 30 | | | 30 | 40 | 30 | 20 |
| Pentaerythritol | | 10 | | | 30 | | | 20 | 30 | 40 |
| Zinc borate | | 10 | 10 | | | 30 | 30 | | | |
| Vertical flame test (VW-1) | not passing the test | Not passing the test | not passing the test | not passing the test | not passing the test | not passing the test | not passing the test | not passing the test | passing the test | passing the test |
| Rank of flame retardancy | x | x | x | x | x | x | ▲ | Δ | — | — |

| | | Comparative Example Z8 | Comparative Example Z9 | Comparative Example Z10 | Comparative Example Z11 | Comparative Example Z12 | Example Z4 | Example Z5 | Example Z6 |
|---|---|---|---|---|---|---|---|---|---|
| | A-1085 | 100 | 100 | 100 | 100 | 100 | 100 | 100 | 100 |
| | $Mg(OH)_2$ | 220 | 220 | 220 | 220 | 220 | 220 | 220 | 220 |
| | Melamine cyanurate | | 30 | | | 30 | 15 | 10 | 5 |
| | Pentaerythritol | | | 30 | | 30 | 5 | 10 | 15 |
| | Zinc borate | | | | 30 | 30 | | | |
| | Vertical flame test (VW-1) | not passing the test | Not passing the test | not passing the test | not passing the test | not passing the test | Not passing the test | passing the test | passing the test |
| | Rank of flame retardancy | x | ▲ | ▲ | ▲ | ▲ | Δ | — | — |

1) Unit: parts by weight
2) In the Table, a blank column means that the corresponding component was not blended.

Examples Z7 to Z9, Comparative Examples Z13 to Z15

Tafmer™A-1085, magnesium hydroxide, melamine cyanurate, pentaerythritol and zinc borate were blended in the amounts (weight parts) shown in Table 5, and melt-kneaded and pelletized at a resin temperature of 190° C. in a Banbury mixer, to give pellets of a polymer composition.

The polymer composition was applied to a thickness of 1.0 mm around a conductor (outer diameter: 4.8 mm) of 7 twisted soft copper yarns having a stock yarn diameter of 1.6 mm, at a dice temperature of 220° C. at a screw revolution of 30 rpm at a throughput of 1.6 to 1.8 kg/hr in a melt-extruder (Laboplast Mill manufactured by Toyo Seiki) having an electric wire coating dice arranged therein, whereby an insulating electric wire sample having a diameter of 6.8 mm was obtained. The resulting sample was examined in the vertical flame test (VW-1) in the same manner as described above. The results are shown in Table 5.

TABLE 5

Conductor: number of yarns in wire/diameter of yarn = 7/1.6, outer diameter = 4.8 mm, finishing diameter = 6.8 mm

| | Comparative Example Z13 | Comparative Example Z14 | Comparative Example Z15 | Example Z7 | Example Z8 | Example Z9 |
|---|---|---|---|---|---|---|
| A-1085 | 100 | 100 | 100 | 100 | 100 | 100 |
| $Mg(OH)_2$ | 150 | 150 | 150 | 150 | 150 | 150 |
| Melamine cyanurate | | | 20 | 25 | 20 | 15 |
| Pentaerythritol | | 20 | | 15 | 20 | 25 |
| Zinc borate | | 20 | 20 | | | 30 |
| Vertical flame test (VW-1) | not passing the test | not passing the test | not passing the test | not passing the test | passing the test | passing the test |
| Rank of flame retardancy | x | ▲ | ▲ | Δ | — | — |

1) Unit: parts by weight
2) In the Table, a blank column shows that the corresponding component was not blended.

INDUSTRIAL APPLICABILITY

According to the present invention, there can be provided a thermoplastic resin composition (Y) showing excellent break strength and elongation at break, excellent in pliability and flexibility and also excellent in scratch resistance and whitening on bending, as well as its molded product.

The thermoplastic resin composition (Y) according to the present invention has the above-described effect, and thus it is suitable for applications to various molded products such as an electric wire covering, tape, film, flame-retardant sheet, pipe, blow-molded product and flame-retardant wall paper, and particularly it is suitable for applications to a covering with electric wires, such as an electric wire sheath and an insulating material for electric wires.

According to the present invention, there can be provided the polymerization composition (Z) having a high flame retardant effect, as well as its molded product.

The polymer composition (Z) of the present invention according to the present invention has the above-described effect, and thus it is suitable for applications to various molded products such as an electric wire covering, tape, film, sheet, pipe and blow-molded product, and particularly it is suitable for applications to a covering with electric wires, such as an electric wire sheath and an insulating material for electric wires.

The invention claimed is:

1. A thermoplastic resin composition (Y) comprising the following (A) to (C):
   (A) 20 to 64.9 wt % of an ethylene copolymer comprising (A-1) an ethylene/1-butene copolymer and (A-2) an ethylene polymer other than (A-1) in such a ratio that (A-1)/(A-2) is 20/80 to 100/0 by weight,
   (B) 35 to 70 wt % of a metal hydroxide, and
   (C) 0.1 to 30 wt % of a graft-modified ethylene polymer, wherein the ethylene/1-butene copolymer (A-1) has the following properties:
   (i) a density (ASTM D1505, 23° C.) in the range of 857 to 890 kg/m$^3$,
   (ii) a melt flow rate (MFR$_2$) (ASTM D1238, loading 2.16 kg, 190° C.) under a loading of 2.16 kg at 190° C. in the range of 0.1 to 100 g/10 min., and
   (iii) an index (Mw/Mn) of molecular-weight distribution evaluated by GPC in the range of 1.5 to 3.5 and
   the graft-modified ethylene polymer (C) is a graft-modified product with an unsaturated carboxylic acid or a derivative thereof wherein the amount of the graft is 0.01 to 10 wt %, and the ethylene polymer before graft-modification is an ethylene/1-butene copolymer having the following properties:
   (i) a density (ASTM D1505, 23° C.) in the range of 857 to 890 kg/m$^3$,
   (ii) a melt flow rate (MFR$_2$) (ASTM D1238, loading 2.16 kg, 190° C.) under a loading of 2.16 kg at 190° C. in the range of 0.1 to 20 g/10 min., and
   (iii) an index (Mw/Mn) of molecular-weight distribution evaluated by GPC in the range of 1.5 to 3.5.

2. A molded product comprising the thermoplastic resin composition (Y) according to claim 1.

3. The molded product according to claim 2 wherein the molded product is an insulating material for electric wires.

4. The molded product according to claim 2 wherein the molded product is a sheath for electric wires.

5. A polymer composition (Z) comprising:
   (AA) 100 parts by weight of at least one thermoplastic polymer (aa 1) or at least one thermosetting polymer (aa2),
   (BB) 50 to 250 parts by weight of a metal hydroxide,
   (E) 0.1 to 40 parts by weight of a triazine ring containing compound, and
   (F) 0.1 to 40 parts by weight of a polyhydric alcohol,
   wherein the composition is free of a phosphorous-based flame retardant.

6. The polymer composition (Z) according to claim 5, wherein the thermoplastic polymer (aa1) is an ethylene polymer.

7. The polymer composition (Z) according to claim 5, wherein the weight ratio of the polyhydric alcohol (F) to the triazine ring containing compound (E) is in the range of the following relationship (1):

$$(F)/(E) \geq 1 \quad (1).$$

8. A molded product comprising the polymer composition (Z) according to claim 5.

9. The molded product according to claim 8 wherein the molded product is an insulating material for electric wires.

10. The molded product according to claim 8 wherein the molded product is a sheath for electric wires.

* * * * *